United States Patent [19]
Carter et al.

[11] 4,269,370
[45] May 26, 1981

[54] APPARATUS FOR CONTINUOUS AUTOMATIC SPOOLING OF MOTION PICTURE FILM

[75] Inventors: William D. Carter, Rancho Palos Verdes; Martin S. Mueller, Torrance, both of Calif.

[73] Assignee: Carter Equipment Co., Inc., Lawndale, Calif.

[21] Appl. No.: 86,573

[22] Filed: Oct. 19, 1979

[51] Int. Cl.³ .................. B65H 19/20; B65H 19/04
[52] U.S. Cl. ............................ 242/56 A; 242/56.9
[58] Field of Search ............ 242/56.9, 56 A, 64, 242/67.1 B, 56 R

[56] References Cited

U.S. PATENT DOCUMENTS

| | | | |
|---|---|---|---|
| 2,620,141 | 12/1952 | Langbo | 242/56 A |
| 3,179,348 | 4/1965 | Nystrand | 242/56 A |
| 3,421,709 | 1/1969 | Breacker | 242/56 A |
| 3,472,462 | 10/1969 | Young | 242/56 A |
| 3,848,824 | 11/1974 | Schijndel | 242/56 A |

*Primary Examiner*—Edward J. McCarthy
*Attorney, Agent, or Firm*—Gene W. Arant; Thomas I. Rozsa

[57] ABSTRACT

An improved method and an improved apparatus for automatic spooling for continuous accumulation of flexible web materials such as a motion picture print film that is fed from a film printing machine.

4 Claims, 13 Drawing Figures

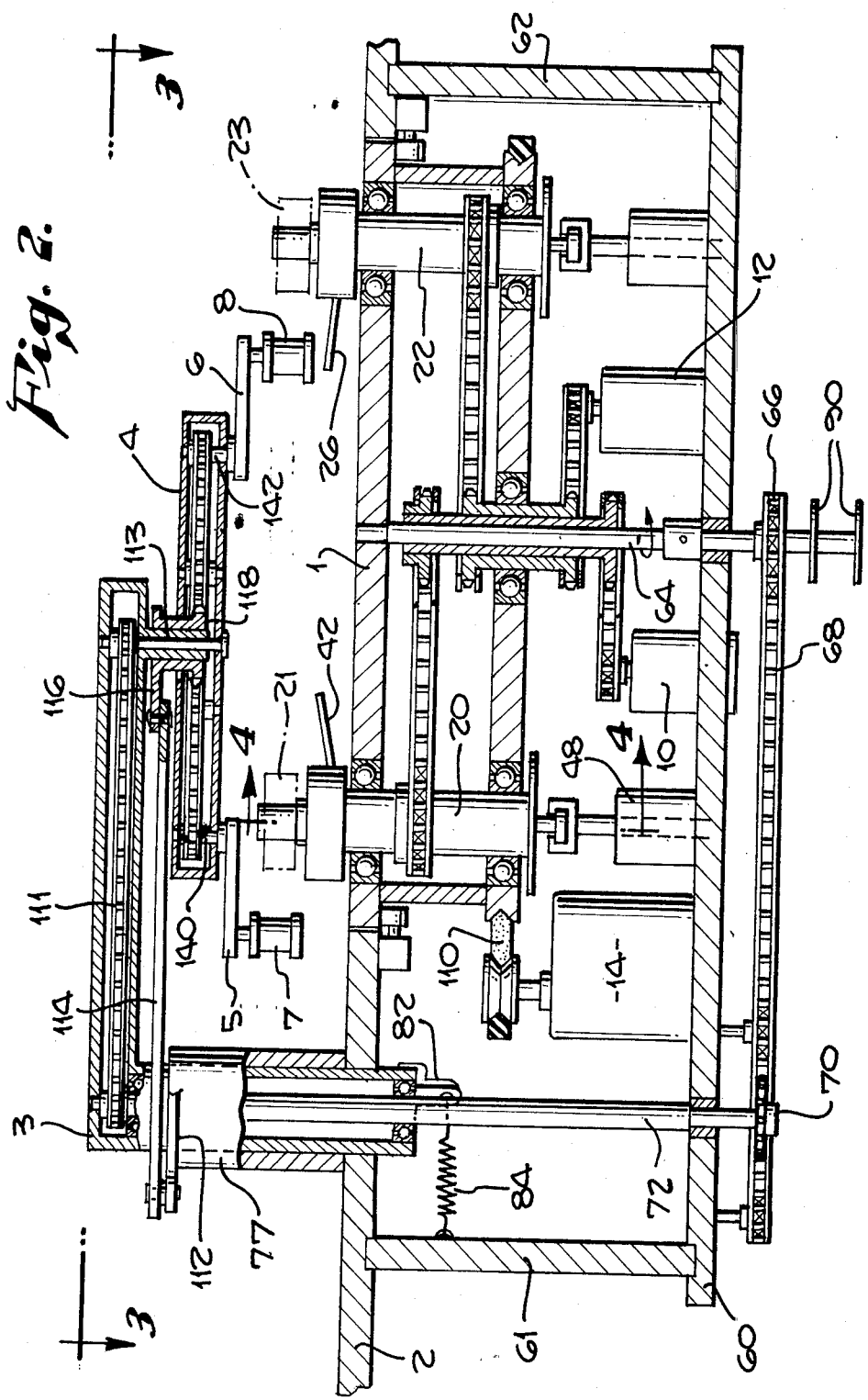

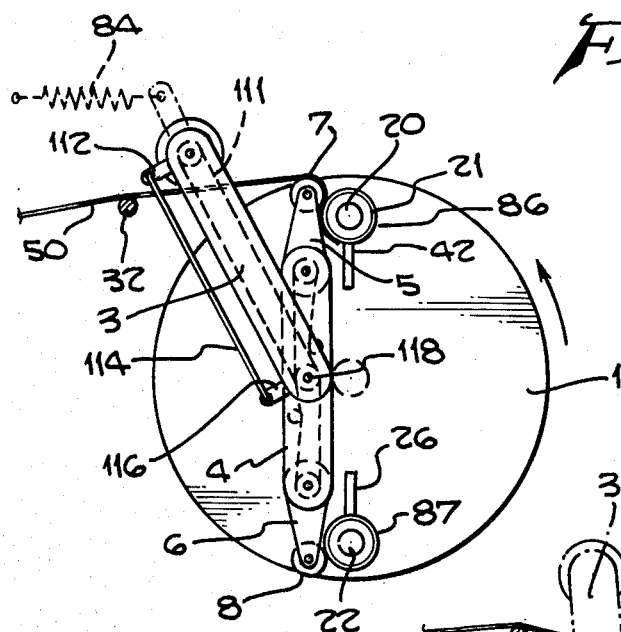
Fig. 3.a
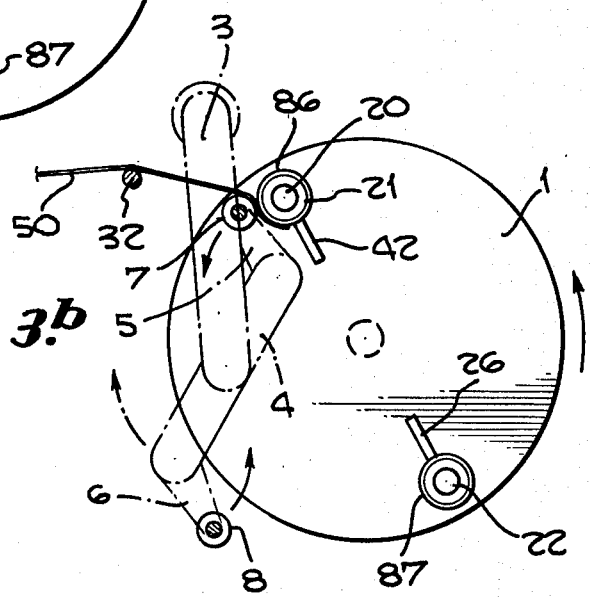
Fig. 3.b
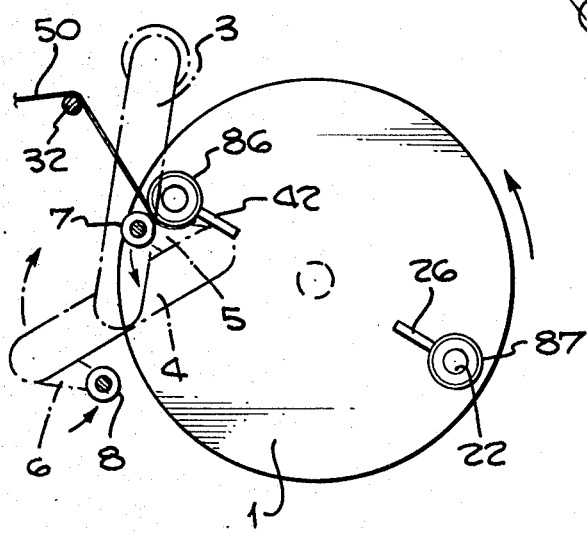
Fig. 3.c

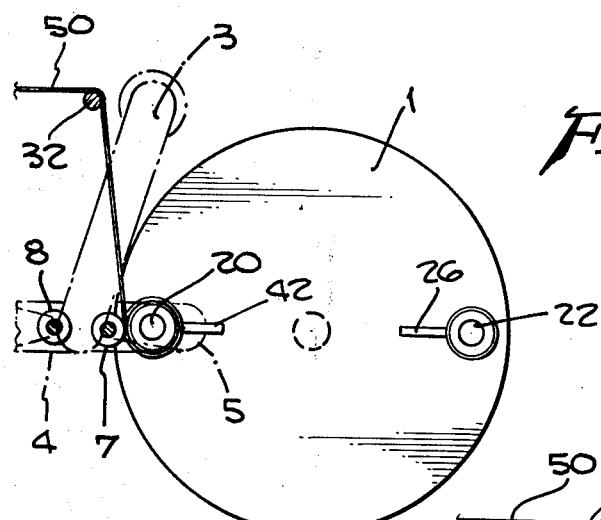
Fig. 3.d
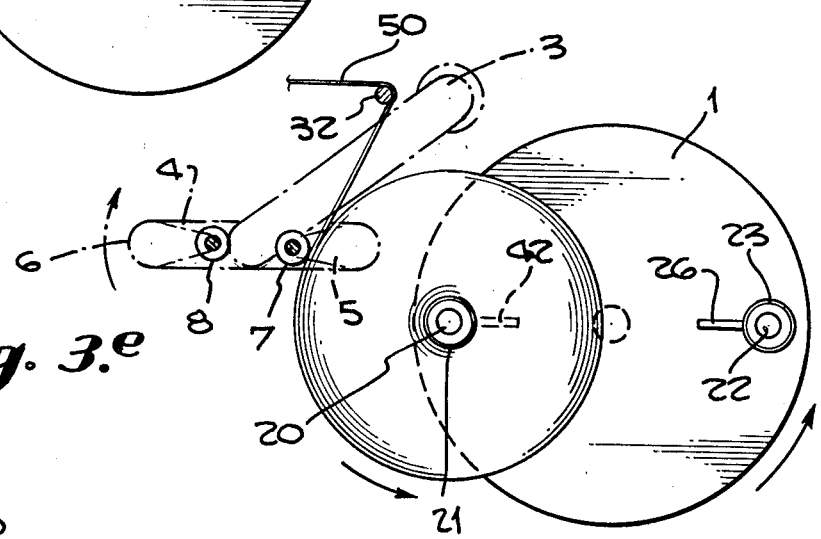
Fig. 3.e
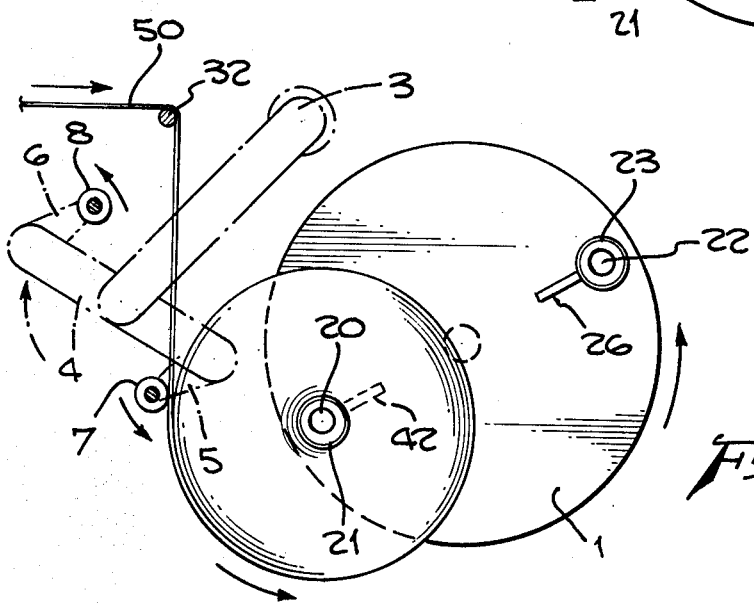
Fig. 3.f

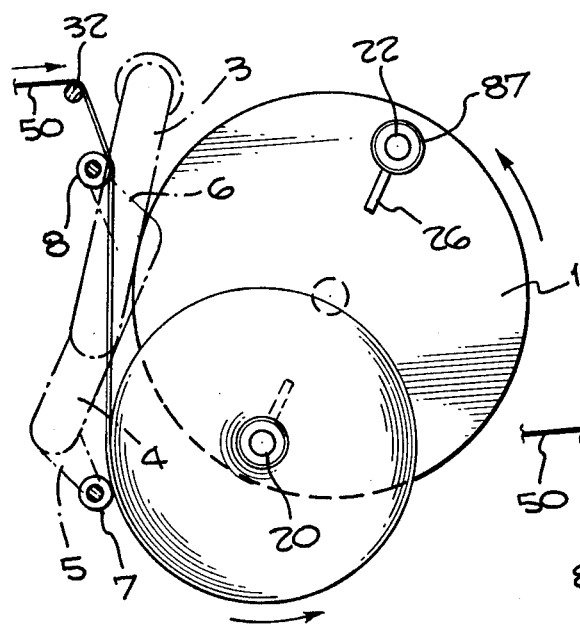
Fig. 3.g
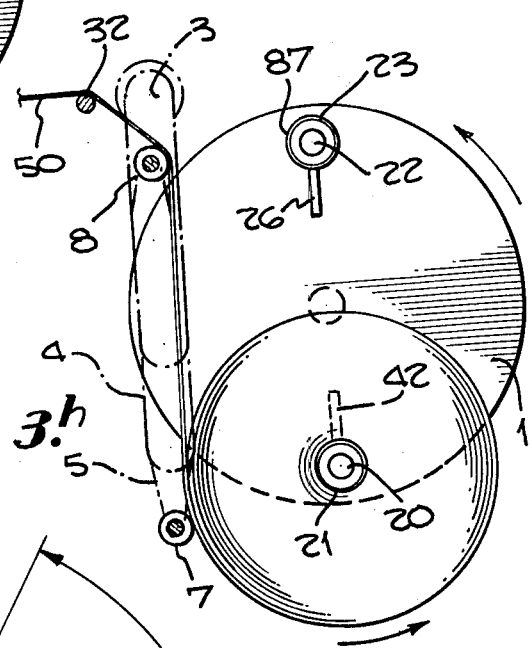
Fig. 3.h
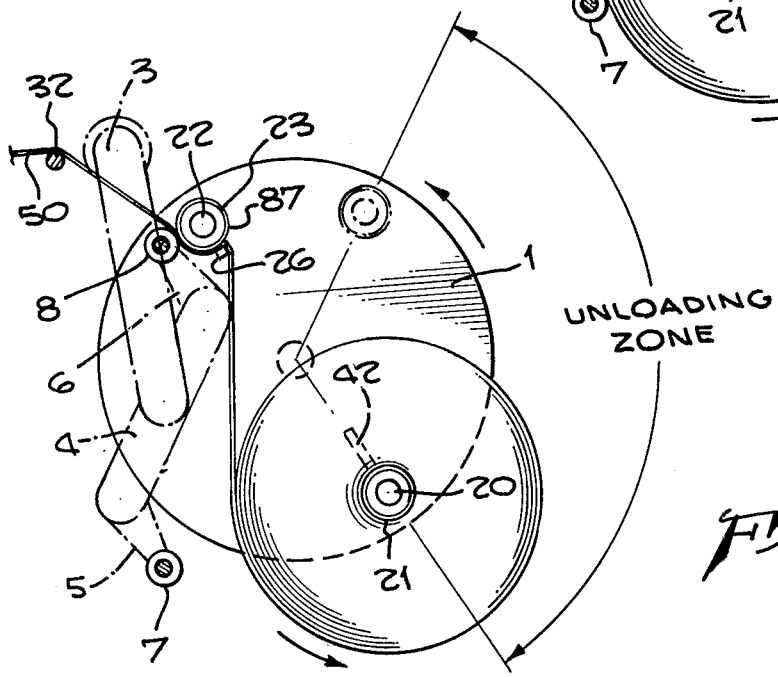
Fig. 3.j

APPARATUS FOR CONTINUOUS AUTOMATIC SPOOLING OF MOTION PICTURE FILM

BACKGROUND OF THE INVENTION

The present invention relates to the use of an automatic spooling apparatus for continuous accumulation of flexible web or strip material such as a motion picture film. The present invention is intended to be used in conjunction with a source such as a film printing machine that prints a master picture negative and/or a master sound track onto a length of raw stock or unexposed film which is then fed to the automatic spooling apparatus for spooling or winding into rolls. The scope of the present invention incorporates both the apparatus for and the method of continuous accumulation of flexible web materials, for use with a film printing machine that exposes film either in air or in a liquid medium such as that disclosed in Carter et al U.S. Pat. No. 4,105,329.

During the process of high volume, high speed duplication of flexible web material such as motion picture film, it is necessary to have an apparatus which can efficiently wind and accumulate the flexible web materials in a roll fashion after it has passed through the duplication or film printing machine. Mechanisms currently in use to wind and accumulate such flexible web materials have definite limitations.

One frequently used method of winding printed photographic film is to provide alternate spooling or "take-up" spindles which are supplied with a flow of flexible web material. This requires stopping the printing machine at frequent intervals in order to manually break the flexible web at a predetermined point after one spool has been fully wound, and/or adding a new core in order to commence spooling of a new roll on the previously unloaded or empty spindle. This reduces the speed with which the film can be exposed and printed and reduces the output volume of finished product.

According to another method an interim accumulator, known in the film processing trade as "an elevator" is used to accumulate incoming film which is continuously being fed from the film printing machine while the operator stops the accumulating device to remove a fully wound spool and insert a fresh core to begin winding a new spool. The "elevator" or buffering apparatus is located between the flexible web printing machine and the flexible web accumulation and spooling mechanism. The "elevator" is voluminous in size and contains many rollers and other mechanical elements which require a large amount of maintenance to assure proper operation and a clean environment so that the exposed film will not be damaged. The higher the transport speed from the flexible web printing machine and the higher the winding rate of the flexible web spooling mechanism, the larger the capacity of the elevator or buffer that is required to permit the manual operations of breaking, respooling, and subsequent removal of the previous roll whether or not two or more take-up spindles are available.

The present invention overcomes many limitations of the existing systems and provides a significant improvement in the accumulation and spooling of flexible web materials during the process of high speed and high volume duplication of said flexible web materials. While the description in the specification relates to the use of motion picture film, the present invention is also applicable to any flexible web-type material such as microfilm, paper, vinyl, and the like. It is, therefore, a primary object of the present invention to provide a means for greatly improving the efficiency with which such flexible web material is accumulated and spooled.

A further object of the present invention is to provide an apparatus for efficiently winding and accumulating flexible web material after it has passed through a duplication or film printing machine.

Another object of the present invention is to reduce the manual labor required for removing filled spools of material and inserting empty spools and restarting the winding operation.

A further object of the present invention is to significantly reduce the total operator time required for removal of the fully wound flexible web spool and adding a new core and securing the flexible web material thereto prior to commencing the spooling of the next roll of flexible web material, thereby allowing a higher speed of printing or duplicating and providing a higher output volume of finished product.

A further object of the present invention is to provide an apparatus for efficiently and rapidly winding and accumulating the flexible web material wherein the operator need not be present to manually sever the flexible web at the desired point, and additionally need not be immediately present to remove the completed roll after it has been wound.

Yet another object of the present invention is to eliminate the need for the interim accumulator or "elevator" in use with existing spooling systems.

The major advantages of the present invention are most fully realized where high linear speeds of web material are used and therefore short periods of time are available to the operator for changeover from one spindle to the other, and removal of the previously wound roll.

SUMMARY OF THE INVENTION

The present invention provides an improved method and apparatus for automatic spooling for continuous accumulation of flexible web materials such as motion picture print film which is fed from an external source. Said external source may be a film printing machine that prints (exposes) the master picture negative onto a length of unexposed film such as that disclosed in Carter et al U.S. Pat. No. 4,105,329.

More specifically, the present invention provides a method of automatically accumulating a flexible web material such as a length of motion picture film and winding same around a central film core to form a completed roll of material, said flexible web being supplied to the present invention by a machine such as a motion picture printing machine. The method further involves automatically and continuously "taking-up" (spooling) said flexible web of material into a series of separate rolls each of which carries an approximately equal length of material, without the need for making changes in the speed at which the material is supplied and without the use of intermediate storage means. The method is adaptable to use with both motion picture printing machines that are seen in air (called "dry" printing) or with motion picture printing machines which have the printing mechanism immersed in a liquid medium (called "wet" printing) as illustrated in the Carter et al U.S. Pat. No. 4,105,329.

The present invention also provides an apparatus for carrying out the above method.

According to one feature of the invention the continuous flexible material moves rapidly and at constant speed, with its output end being automatically switched from one spool (core) to the next so as to fill a series of spools without any interruption or slowing down in the movement of the material.

According to the method of the present invention the leading end of the continuous flexible material is wound upon a first spool, then when the first spool is nearly full a second spool is brought into contact with the material at a location prior to that of the first spool, the flexible material is then severed at the location of the second spool so as to conclude the loading of the first spool, and then the newly cut end of the flexible material is secured to the second spool which has already been drivingly rotated so that the material is then wound at full speed upon the second spool.

Also in accordance with the invention, two or more spools are sequentially moved around a continuous loop path, with the incoming material being first wound on one spool and then on the next spool in sequence, with the motion of the spools being such that the cutting of the incoming flexible material always occurs at a first point on the continuous loop path and the conclusion of loading of each spool always occurs at a second point on the path.

A novel apparatus provided in accordance with the present invention is a spindle assembly incorporating a knife blade that rotates with the spindle assembly and with a spool carried on the assembly, the knife blade being selectively operable to engage the exterior surface of the spool so as to cut and sever a continuous flexible web material that is then moving past the spool.

Further in accordance with the invention, the preferred form of spindle assembly is such as to immediately grasp the newly cut end of the continuous flexible material, so that the continued rotation of the spindle immediately initiates the winding of the flexible material upon the previously empty spool which it carries.

DRAWING SUMMARY

Referring particularly to the drawings for the purposes of illustration only and not limitation, there is illustrated:

FIG. 2 is a cross-sectional view of the present invention taken along line 1—1 of FIG. 1.

FIGS. 3a, b, c, d, e, f, g, h, and j, are diagrammatic representations of the flexible web spooling sequence operation.

Figure 4:
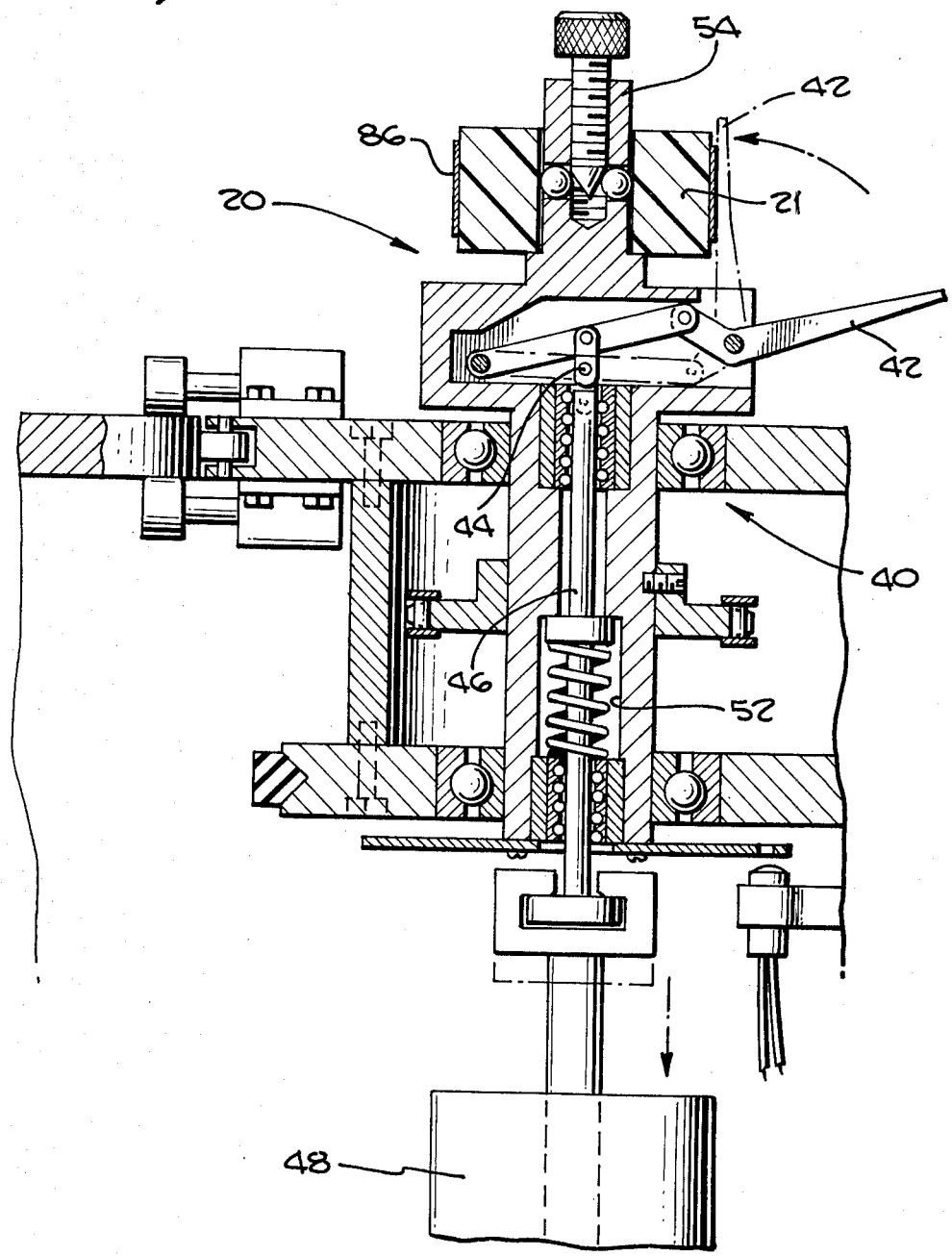

FIG. 4 is a cross-sectional view of a core support spindle assembly, cut and trap arm, and actuating mechanism assembly for same taken along line 4—4 of FIG. 2.

Figure 5:
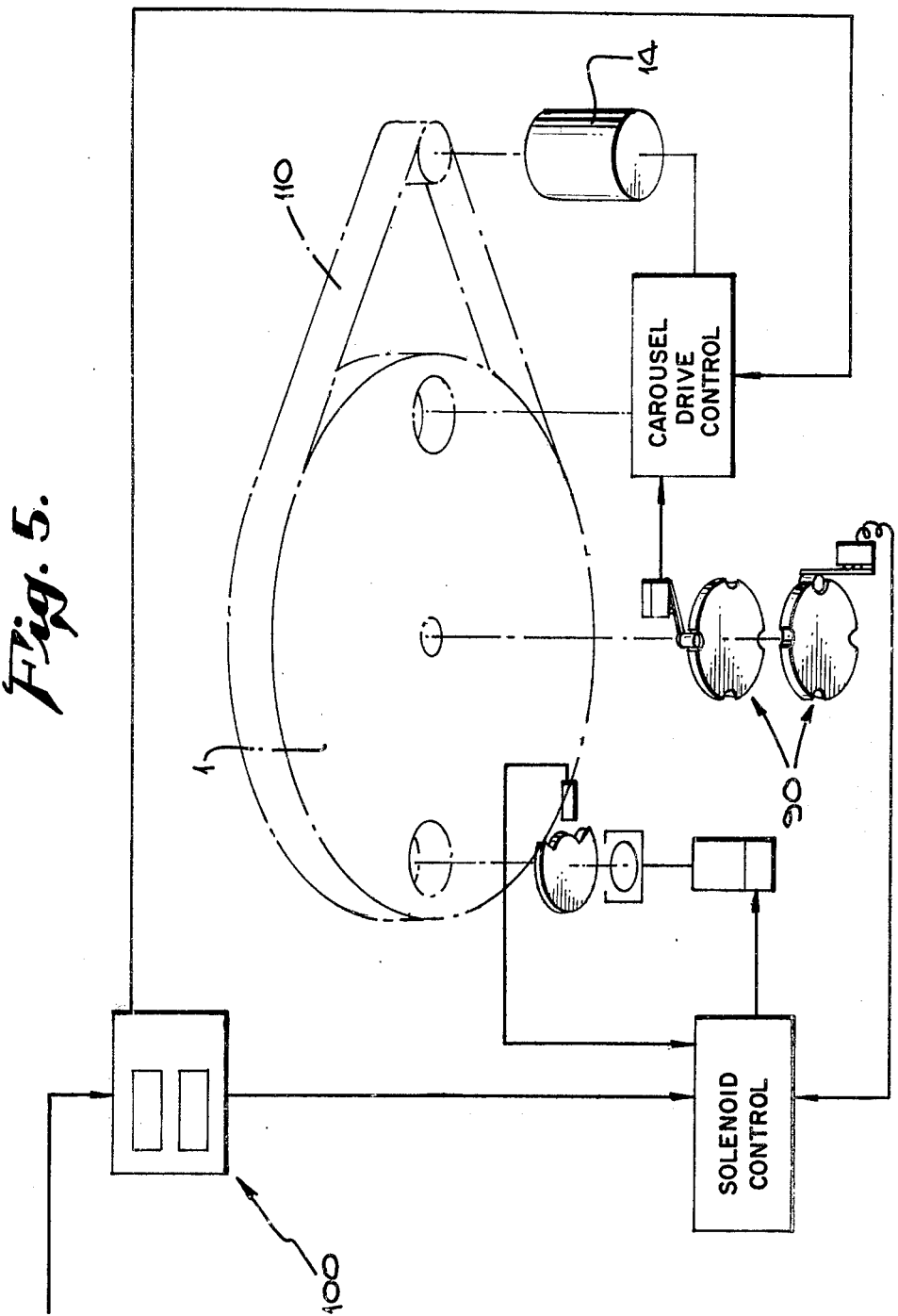

FIG. 5 is a schematic representation of an electromechanical control system for the present invention.

DESCRIPTION OF THE PREFERRED EMBODIMENT

Figure 1:
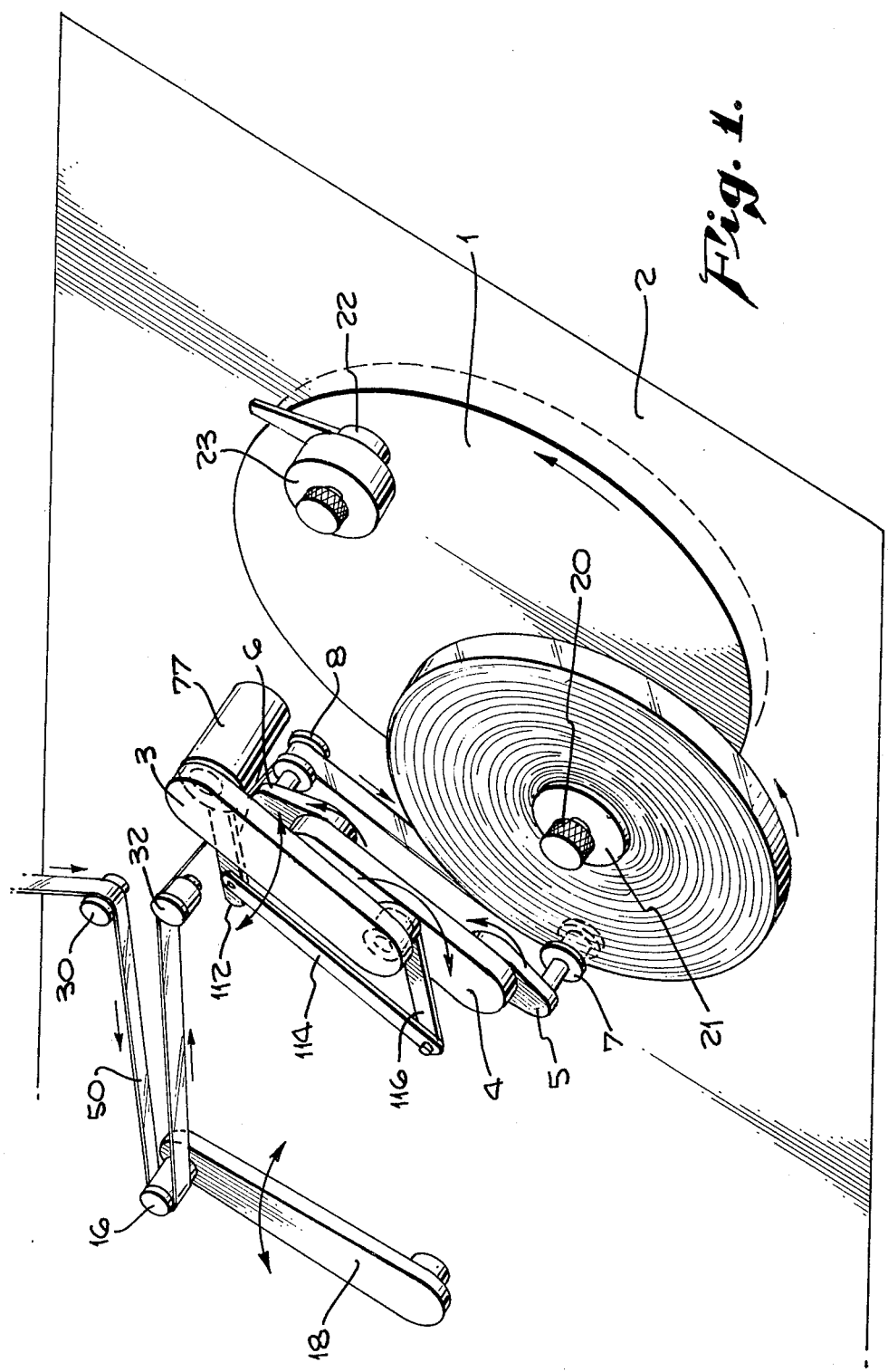
FIG. 1 is a top perspective view of the top portion of the Automatic Spooling Apparatus for Continuous Accumulation of Flexible Web Materials.

With reference to the drawings of the invention in detail and more particularly to FIG. 1, the present invention is shown from a top perspective view.

The present invention is physically centered around a circular plate-shaped carousel or base plate 1 which fits into the cavity of and is surrounded by a face plate 2. Mounted upon said face plate 2 is a main support tube 77 which pivotally supports the main support arm 3. Referring to FIG. 2, said main support arm 3 in turn positions and pivotally supports a secondary support arm 4 through appropriate mechanical coupling means 111 and pivot shaft 113. Said secondary support arm 4 in turn positions and pivotally supports a first guide roller support arm 5 and positions and pivotally supports a second guide roller support arm 6. Said guide roller support arm 5 and 6 are also positioned through appropriate gear means which include a strut 112 attached to and aligned perpendicular to the longitudinal axis of said main support tube 77. Attached pivotally to said strut 112 is an arm 114 which is pivotally attached to connecting plate 116 (FIG. 1) at its other end. Said connecting plate 116 is rigidly attached to sun sprocket gear 118, which in turn is mechanically coupled to guide roller support arm pivot shafts 140 and 142 and rotationally positions same. First guide roller support arm 5 provides pivotal support to first guide roller 7. Second guide roller support arm 6 provides pivotal support to second guide roller 8.

With reference to FIG. 1, pivotally mounted on said main face plate 2 and adjacent said carousel or base plate 1 and adjacent said main support arm 3 is a tension sensing roller support arm 18. Said tension sensing roller support arm 18 pivotally supports a tension sensing roller 16. Rigidly mounted on said face plate 2 and between said tension sensing roller 16 and said main support arm 3 are two feed rollers, a first feed roller 30 and a second feed roller 32.

Rotatably mounted to said carousel 1 is a first core supporting spindle assembly 20 and a second core supporting spindle assembly 22. Removably mounted on said first core supporting spindle assembly 20 is a first film core 21 and removably mounted on said second core supporting spindle assembly 22 is a second film core 23.

With reference to FIG. 4, a cross-sectional view of a core supporting spindle assembly 20 is shown. Said first core supporting spindle assembly 20 comprises the following key elements: a film cut and trap assembly 40 which contains a film cut and trap arm 42 and attendant linkage 44 such that actuation by means of connecting rod 46 permits operation of said film cut and trap arm 42 when activated by solenoid 48, and a cylindrical hollow spindle shaft 52 which contains cavities to accommodate said film cut and trap assembly 40 and associated mechanisms heretofore described, and which terminates in a core hub 54 which is adapted to removably receive and support in a non-rotatable fashion with respect to said core hub 54 a conventional motion picture core such as first film core 21. Second core supporting spindle assembly 22 is identical to said first core supporting spindle assembly 20.

With reference to FIG. 2, a diagrammatic cross-sectional elevational view of the present invention is shown. The present invention is shown mounted on a main mounting plate 60. Said face plate 2 is rigidly mounted to said main mounting plate 60 through standoffs 61 and 62. Said carousel 1 is rotatably mounted to said main mounting plate 60 through a carousel drive shaft 64. Rigidly attached to said carousel drive shaft 64 is a drive shaft gear 66 which transmits its rotational position via a drive chain 68 to a gear 70 which is affixed to the main support arm drive shaft 72. Said carousel 1 is rotatably driven in a counterclockwise direction when viewed from above by a carousel driving means 14 through an appropriate linkage mechanism such as a rim driving belt 110. The rotational position of said carousel 1 is transmitted to and affects said main support arm 3 via a spring actuated strut 82 which is rigidly attached at one end to the exterior of the vertical portion of main support arm 3 and which is pivotally attached at its other end to a spring 84. The spring 84 is in turn attached at its other end to standoff 61. At the base of said carousel drive shaft 64 is a carousel position sensing disc 90 which is connected to an electromechanical actuating system shown as 100 in FIG. 5 which consists of conventional components to control and regulate the sequencing and positioning of the carousel 1 and the appropriate actuation of the cut and trap arm 42.

Said first core supporting spindle assembly 20 is driven by first core supporting spindle drive means 10 through appropriate gear train mechanisms. Said second core supporting spindle assembly 22 is driven by second core supporting spindle drive means 12 through appropriate gear train mechanisms.

OPERATION

In operation the flexible web or strip 50 which, for example, can be the exposed motion picture film generated by a motion picture printing machine passes around the periphery of first feed roller 30, then over tension sensing roller 16 then around the periphery of second feed roller 32. First core supporting spindle assembly 20 is initially located in the twelve o'clock position on carousel 1 as shown in FIG. 3a. First film core 21 has previously been mounted on first core hub 54. Said first film core 21 has double sided pressure sensitive tape 86 wrapped around its circumference. Said flexible web or strip 50 is led from second feed roller 32 and is manually secured to said tape wrapped first film core 21 in order to commence the initial cycle. The system is initially activated by commencing the winding of the flexible web on first core 21 by activation of first core spindle drive means 10. Said first film core 21 rotates in a counterclockwise direction when viewed from above.

During the spooling operation, the carousel 1 is activated to rotate in a counterclockwise direction by carousel drive means 14. When the carousel 1 has rotated 90 degrees counterclockwise such that said first core supporting spindle assembly 20 is in a 9 o'clock position, as shown in FIG. 3d, the carousel 1 stops rotating while film 50 continues to spool around said first film core 21. Carousel 1 remains in said 9 o'clock position as shown in FIG. 3e while first core supporting spindle assembly 50 continues to spool film until a predetermined amount of film has been wound at which point an electromechanical mechanism 100 which counts the lengths of the film, once again activates carousel drive means 14 such that carousel 1 rotates an additional 90 degrees to the 6 o'clock position and stops as shown in FIG. 3h. First core supporting spindle assembly 20 continues to spool film during this entire process. Concurrently, while the carousel 1 remains in said 9 o'clock position, an operator places an empty core which will be second film core 23 on second film core supporting spindle assembly 22 which is now at the 3 o'clock position due to the 90 degree counterclockwise rotation of the carousel 1 as shown in FIG. 3e. Shortly after first core supporting spindle 20 has passed the 6 o'clock position which represents more than a 180 degree counterclockwise rotation and the desired roll length is reached, as will be shown later, the incoming length of film is guided so as to be properly positioned with respect to second core supporting spindle assembly 22 such that second cut and trap arm 26 is activated and the film is cut to complete the spooling of the roller first film core 21, as shown in FIG. 3j. Said second cut and trap arm 26 causes the incoming length of film 50 to commence spooling around second film core 23, by having said cut and trap arm remain in contact with the film core for approximately three quarters of its initial revolution such that the film 50 is secured to second film core 23 by means of double sided tape 87 as previously discussed, and as shown in FIG. 3j. The cut and trap arm 26 is then automatically retracted and the cycle automatically begins over again.

In order to assure proper film spooling throughout the cycle, it is necessary that a guide roller remain in contact or close proximity with the film being spooled throughout the spooling cycle. This is accomplished by the use of an articulated mechanism consisting of a main support arm 3, a secondary support arm 4, first and second guide roller support arms 5 and 6 respectively, and first and second guide rollers 7 and 8, respectively. The relative rotational position of aforementioned components is also determined by the diameter of the roll of film being spooled at a given instant and by mechanical coupling to carousel 1. This can be most readily observed by diagrammatic representation of aforementioned components as graphically illustrated in FIGS. 3a, b, c, d, e, f, g, h, and j.

While a detailed description of the operational cycle has been presented in order to satisfy statutory requirements, it is not necessary for the spooling cycle to begin at the 12 o'clock position and it is not necessary for the rotating core supporting spindle assembly 20 and film core 21 to stop at four places which are 90 degrees apart. For example, the spooling cycle may begin at the 11 o'clock or 9 o'clock position or even while the carousel is in motion with only two stops 180 degrees apart along the continuous loop path cycle without departing from the spirit or scope of the present invention.

By way of example only, the first core supporting spindle drive means 10 may be an electric motor, the second core supporting spindle drive means 12 may be an electric motor, and the carousel drive means 14 may be an electric motor.

ALTERNATE FORMS

The invention has been described in considerable detail in order to comply with the patent laws by providing a full public disclosure of at least one of its forms. However, there are alternate forms of embodiment may be used without departing from the spirit or scope of the invention.

The above specification describes a process wherein a flexible web is travelling from left to right in a specific embodiment that requires the spindles to be rotating in a counterclockwise direction. It is also within the scope of the present invention to reverse the direction of flow so that the flexible web can be travelling from right to left in which event the spindles will be rotating in a clockwise direction. The scope of the present invention also encompasses alternative methods of winding said flexible web wherein the surface of said flexible web with respect to the periphery of the core is altered so that different directions of spindle rotation are required to properly spool the flexible web.

Said first core supporting drive means 10 may be a mechanically operated coupling mechanism, said second spindle drive means 12 may be a mechanically operated coupling mechanism, and the carousel drive means 14 may be a mechanically operated coupling mechanism. Said carousel 1 has been described as being circular in shape. However, it may be embodied in any other convenient form such as a square or rectangular plate. The above specification described the present invention as having two core supporting spindle assemblies, 20 and 22, respectively. Alternative embodiments within the scope of the present invention encompass the utilization of two, three or more core supporting spindle assemblies. The above specification describes said carousel 1 rotating in a counterclockwise direction. Alternative embodiments within the scope of the present invention involve having carousel 1 rotate in a clockwise direction as necessary or remaining stationary and not rotating at all. It is within the scope of the present invention to have the entire apparatus housed with a cabinet or closed container, or to have the entire apparatus remain partially enclosed or entirely freestanding without any enclosing assembly. It is further within the scope of the present invention to have the entire apparatus immersed in a liquid medium which is compatible with the flexible web or to have the entire apparatus operate in an air medium. It is within the scope of the present invention to have alternate articulating mechanisms replacing said main support arm 3, said secondary support arm 4, said first and second guide roller support arms 5 and 6, respectively, and said first and second guide rollers 7 and 8 with alternative mechanisms that allow carousel 1 to remain stationary while the alternate mechanism performs the required functions and which allow the entering flexible web to enter the present invention at various angles from the feed apparatus. Said core supporting spindles may rotate clockwise if required instead of counterclockwise as described without departing from the spirit or scope of the present invention. Said spring 84 may be replaced by an alternate mechanism without departing from the spirit or scope of the present invention.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the methods shown are intended only for illustration and for disclosure of an operative embodiment and not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. Apparatus for winding or spooling a continuously moving length of motion picture film onto a series of separate spools or their equivalent, each of which carries an approximately equal length of motion picture film, without the need for making substantial changes in the speed at which the motion picture film is supplied to the apparatus and without the use of intermediate storage means, comprising, in combination:

a base plate aligned in a predetermined plane;

means for feeding said length of motion picture film in a direction parallel to said predetermined plane and alongside said base plate, and with the transverse plane of said motion picture film itself being perpendicular to said predetermined plane;

a plurality of spindles extending perpendicular to said base plate and rotatably carried by said plate, each of said spindles, when appropriately positioned, being adapted to carry a spool upon which said motion picture film is wound;

a plurality of spindle drive means, each associated with a corresponding one of said spindles and selectively operable to rotatably drive the associated spindle so as to thereby draw said motion picture film into a roll upon a spool carried by the associated spindle;

a guide mechanism having a plurality of guide rollers thereon, said guide mechanism being supported relative to said base plate so that all of said guide rollers are arranged parallel to all of said spindles;

means for rotating said base plate through a series of predetermined positions around a continuous loop path such that the actual position of the second one of said spindles when said base plate has rotated a predetermined amount corresponds to the actual position previously occupied by the first one of said spindles when the base plate was in its first position;

means for adjusting the positions of said guide rollers in response both to the rotational position of said base plate and the then existing diameter of a roll of motion picture film being formed on one of said spindles, said guide rollers being operable when one roll is nearly completed to guide the incoming length of motion picture film immediately adjacent the next succeeding spindle; and means cooperatively associated with said next succeeding spindle and selectively operable when said one roll is completed to sever the incoming motion picture film and also to place its newly cut end into winding relationship with an empty spool carried by said next succeeding spindle.

2. In an apparatus for automatically winding a rapidly moving continuous flexible web material onto a series of spools, a spindle assembly adapted for supporting and rotatably driving a spool and for cutting said flexible web material to terminate its winding on the spool, said spindle assembly comprising:

a hub for receiving a spool in circumdisposed relation thereto;

a supporting base for said hub;

means associated with said hub for removably locking the spool thereon;

means for rotatably driving said supporting base to thereby rotate said hub and said spool;

a knife blade carried by said base and normally extending radially to the axis of said hub and base, said blade being pivotally movable into parallel relationship to the axis of said hub and base so as to engage the exterior circumferential surface of said spool; and powered means selectively operable for driving said knife in said pivotal movement to thereby contact and sever the incoming piece of said flexible web material that is moving past the spool in contact with said circumferential surface thereof while not cutting any portion of said flexible web material which has already been wound onto the spool.

3. Apparatus for winding or spooling a continuously moving length of motion picture film onto a series of separate spools or their equivalent, each of which carries an approximately equal length of material, without the need for making substantial changes in the speed at which the length of motion picture film is supplied to the apparatus and without the use of intermediate storage means, comprising, in combination:

a main mounting plate aligned in a predetermined plane;

a face plate aligned a fixed distance from and parallel to said main mounting plate, and rigidly attached thereto;

said face plate containing a circular cavity therein;

a circular base plate aligned in the same plane as said face plate, located inside said cavity of said face plate and rotatably mounted to said main mounting plate;

an elongated main support arm aligned a fixed distance from and pivotally attached at one end to said face plate;

an elongated secondary support arm located below and pivotally attached at its center to the opposite end of said elongated main support arm;

a first guide roller support arm located below and pivotally attached to one end of said elongated secondary support arm;

a second guide roller support arm located below and pivotally attached to the opposite end of said elongated secondary support arm;

a first guide roller pivotally supported by said first guide roller support arm;

a second guide roller pivotally supported by said second guide roller support arm;

a tension sensing roller support arm pivotally mounted on said face plate and located adjacent said circular base plate and adjacent said elongated main support arm;

a tension sensing roller pivotally supported by said tension sensing roller support arm;

a first feed roller rigidly mounted on said face plate and located between said tension sensing roller and said elongated main support arm;

a second feed roller rigidly mounted on said face plate and located a fixed distance from said first feed roller;

a first core supporting spindle assembly rotatably mounted near the edge of said circular base plate;

a second core supporting spindle assembly rotatably mounted near the edge of said base plate and located 180 degrees from said first core supporting spindle assembly;

a first film core removably attached to said first core supporting spindle assembly;

a second film core removably attached to said second core supporting spindle assembly;

a first film cut and trap arm rigidly attached to said first core supporting spindle assembly and located below said first film core;

a second film cut and trap arm rigidly attached to said second core supporting spindle assembly and located below said second film core;

a mechanical coupling means between said circular base plate and said elongated main support arm;

a first driving means mechanically coupled to said circular base plate and imparting rotational motion thereto a second driving means mechanically coupled to said first core supporting spindle assembly and imparting rotational motion thereto; and a third driving means mechanically coupled to said second core supporting spindle assembly and imparting rotational motion thereto;

whereby said elongated main support arm, said elongated secondary support arm, said first and second guide roller support arms, said first and second guide rollers, said tension sensing roller, said circular base plate, and said first and second core supporting spindle assemblies act in cooperation wherein the length of motion picture film passes around the periphery of said first feed roller, then passes around said tension sensing roller, then passes around the periphery of said second feed roller, passes around the periphery of said second guide roller, passes around the periphery of said first guide roller is manually secured to said first film core and is wound around said first film core by the rotation provided by said second driving means while said circular base plate is rotated in the same direction by said first driving means until a predetermined amount of film has been wound onto the first film core at which point said first film cut and trap arm is automatically activated to cut the film and said incoming length of film is manually secured to said second film core assembly and the operation of winding the incoming length of film continues in uninterrupted fashion.

4. A first core supporting spindle assembly as defined in claim 3, further comprising:

a core hub which is adapted to removably receive and support in a non-rotatable fashion with respect to the core hub a conventional motion picture core;

a film cut and trap arm located directly below said core hub;

a solenoid which activates said film cut and trap arm;

and mechanical coupling means between said film cut and trap arm and said solenoid.

* * * * *